3,462,262
PROCESS FOR THE RECOVERY OF EXCESS CARBON FROM THE PRODUCT OF AN IRON ORE DIRECT REDUCTION
Walter Koch, Muhlheim, and Ottmar Zugel, Frankfurt, Germany, assignors to Metallgesellschaft Aktiengesellschaft, Frankfurt am Main, Germany, and The Steel Company of Canada Limited, Hamilton, Ontario, Canada
No Drawing. Filed Sept. 8, 1965, Ser. No. 485,941
Claims priority, application Germany, Sept. 19, 1964, M 62,500
Int. Cl. C21b *13/08*
U.S. Cl. 75—33                                                     12 Claims

ABSTRACT OF THE DISCLOSURE

After the removal of reduced iron values from a charge of iron ore, fuel and lime that has been processed in a reducing furnace the carbon content of the residue is also recovered by treatment with oil followed by floatation in water.

---

In known processes for a direct reduction of iron ore, a mixture of the oxidic ore, solid fuel, and an admixture for combining with the sulfur content of the solid fuel, such as lime or dolomite, is reduced in a rotary kiln at temperatures slightly below and softening point of the core to form a sponge iron-like powder which has a high content of metallic iron. For various reasons, it is desirable to use an appreciable surplus of reducing carbon. If the process is to be economical, the carbon which is discharged from the rotary kiln must be separated from the discharged mixture and returned to the process.

The mixture which is discharged from the rotary kiln in the above process contains coal in a particle size of 0-12 mm., mainly 0-5 mm. A major portion of this coal has a particle size above 1 mm. Normally less than 10% of this coal has a particle size below 1 mm. The mixture further contains, e.g., lime, which has a particle size of 1 mm. and more.

Whereas the reduced iron can easily be separated from the discharged mixture, particularly when the ore is charged in pellet form, the separation of the surplus carbon remaining in a particle size between 0 and 5 mm. in the residual mixture from the ashes, the lime and the CaS or MgS formed during the process has not been satisfactorily accomplished or has been accomplished only with a considerable structural expenditure and at considerable operating costs with the aid of the previously known methods. For instance, electrostatic separating processes are effective only within a small particle size range. The sink-float separation process cannot be used because the differences between the specific gravities of the substances to be separated are very small and the extremely fine heavy medium would become deposited in the pores of the activated carbon so that the latter would become contaminated. A recovery of surplus carbon obtained in a process for the direct reduction of iron ore by a flotation process is technologically and economically feasible only within a particle size range up to 2 mm. so that another separating process would have to be adopted for coarser particles.

The oil flotation or oil separation processes used for classifying mined ores and coals, such as are described in Leitfaden der Erzaufbereitung by Gerd Salzmann/Hamann, in the German patent specification No. 932,002 and in the German patent application No. B17,046 opened for public inspection, cannot be applied in this case because the original properties of the coal have been changed to such a degree by the preceding heat treatment and the resulting activation that water which has wetted the coal is not displaced from the porous surface of the coal by the flotation agents so that a satisfactory separation effect cannot be achieved.

Besides, a mixture to be subjected to an oil flotation process must have a much smaller particle size than the mixture discharge from the rotary kiln. This need to grind the mixture to the required fineness prevent an economical recirculation of the coal into the process.

A process of classifying finely ground graphite ores is known, in which the finely ground starting product falls in a finely divided state through atomized kerosene. The separation is then effected by introducing the ore particles into water with stirring. This process, which requires a finely ground starting ore, is not suitable for a classification of the surplus carbon obtained in the process for a direct reduction of iron ore because this carbon must be recirculated and grinding must be avoided for this reason.

It has now been found that the mixture of carbon, lime and ore which is left after the separation of the reduced iron oxide may be treated with relatively small amounts of oils, such as light fuel oil, bunker C oil or crude petroleum, which oil is applied, e.g., through a nozzle, so as to render the carbon hydrophobic. It is surprising that the amount of air which remains occluded in the pore volume of the reactive carbon after this treatment is sufficient to cause the carbon to float in water. When he starting mixture which has thus been treated is introduced into water and the suspension is mechanically agitated, only the carbon floats and this floating carbon is a major portion, at least 90%, based on the carbon in the mixture to be separated, whereas lime, ashes, CaS etc. sink. The amount of oil which is required for a recovery of the surplus carbon according to the invention from the mixture which is discharged from the kiln amounts to only 5–10 percent by weight, based on the mixture to be separated. A major portion of this oil is adsorbed by the carbon and is not lost because its calorific value improves the heat balance of the process.

In a preferred embodiment of the proces according to the invention, the supply of water to the separating vessel is controlled to maintain the slurry at a pH in the basic range, preferably over 10. It has been found that a good separating effect at a particularly high rate of separation is accomplished in this range. Where high viscosity oils, such as bunker C oils, are used, it has been found desirable to effect a separation in hot water, preferably at a temperature of 70° C. or more.

EXAMPLE

Iron ore pellets were reduced in a rotary kiln, using anthracite coal as a reducing agent. The mixture discharged from the rotary kiln was classified in known manner by screening and magnetic separation.

The resulting particle size fraction below 3 millimeters was subjected to a coal enriching treatment according to the invention. The starting material of this treatment had the following particle size distribution:

| Mm.: | Percent |
| --- | --- |
| >3 | 0.7 |
| 3–2 | 25.0 |
| 2–1 | 38.3 |
| 1–0.5 | 18.3 |
| 0.5–0.3 | 5.5 |
| 0.3–0.2 | 3.5 |
| 0.2–0.1 | 3.3 |
| <0.1 | 5.4 |
|  | 100.0 |

Apparent density _____ grams per milliliter__ 0.412
Ash _____percent__ 13.7

A tumbling barrel provided with reversing strips and having an inclination of 3% was used for the treatment with oil. The above-mentioned product passed through the drum continuously at a rate of 95 kilograms per hour. Bunker C oil heated to 120° C. was injected by pressure atomization at a rate of 8.2 liters per hour. The barrel was rotated at 35 revolutions per minute and had an inside diameter of 600 millimeters and a length of 1400 millimeters.

The oil-sprayed mixture was fed down a chute with addition of water into the first of six series-connected stirred containers. The rate at which water was added was so adjusted that a slurry was formed that had a solids content of 200 grams per liter. To avoid a rotation of the slurry, the stirrer was surrounded by baffles. The tailings from the first stirred container were passed in succession through the remaining stirred containers for after-cleaning. The pure coal floating up in each container was continuously skimmed and combined in a mixed concentrate.

The tailings from the last stirring container were evaporated and dried and then weighed and analyzed as overall tailings.

The following products were obtained:

| | Ash, percent |
| --- | --- |
| Starting product (up to 3 mm.) | 13.7 |
| Pure coal (float fraction) | 10.9 |
| Tailings (sink fraction) | 83.3 |

The weighed yield of pure coal was 96.5% of the charged coal, compared to a calculated yield of 96.1%.

What is claimed is:

1. In a process for producing iron from oxidic iron ore, comprising reducing said iron ore below its softening temperature in the presence of carbon to form metallic iron and a particulate residue product containing porous carbon, the major portion of said product having a particle size of at least 1 mm., separating said metallic iron from said product in a dry process, the improvement comprising, recovering said porous carbon from said product by treating said product with 5 to 10% by weight of oil based on the weight of said product to trap air in the pores of the carbon, introducing the oil-treated product into water to cause a separation of said product into a float fraction containing said carbon and a sink fraction, and recovering said float fraction from said water.

2. A process as set forth in claim 1, in which mineral oil is used for treating said product.

3. A process as set forth in claim 1, in which said product introduced into said water has a particle size of up to 5 mm.

4. A process as set forth in claim 1, in which crude petroleum is used for treating said product.

5. A process as set forth in claim 1, in which bunker C oil is used for treating said product.

6. A process as set forth in claim 5, in which said oil-treated product is introduced into water having a temperature of at least 70° C.

7. A process as set forth in claim 1, in which light oil is used for treating said product.

8. A process as in claim 1 in which said oil treated product is introduced into water having a temperature of at least 70° C.

9. A process as set forth in claim 1, in which said water is maintained at a pH-value in the basic range.

10. A process as set forth in claim 1, in which said water is maintained at a pH-value over 10.

11. A process as set forth in claim 1, in which said product treated with oil and introduced into water has an upper particle size limit of 3 to 5 mm.

12. A process as set forth in claim 1, which comprises screening from said product after the separation of metallic iron any particles having a particle size in excess of 3 mm., and then treating said product with oil.

References Cited

UNITED STATES PATENTS

| | | | |
| --- | --- | --- | --- |
| 2,631,968 | 3/1953 | Peery | 209—172 X |
| 2,643,215 | 6/1953 | Hoge | 209—172 X |
| 2,665,980 | 1/1954 | Carkeek. | |
| 2,725,985 | 12/1955 | Howard et al. | |
| 2,903,423 | 9/1959 | Mondria et al. | |
| 3,042,504 | 7/1962 | Carter. | |
| 3,147,093 | 9/1964 | Dille et al. | |
| 736,381 | 8/1903 | Glogner | 209—171 |
| 771,075 | 9/1904 | Kendall | 209—171 |
| 851,600 | 4/1907 | Latimer | 209—171 X |
| 956,773 | 5/1910 | Lockwood | 209—171 X |
| 2,850,164 | 9/1958 | McCue | 209—171 |
| 3,045,818 | 7/1962 | Müschenborn et al. | 209—171 X |
| 3,140,169 | 7/1964 | Smith et al | 75—33 |
| 3,149,961 | 9/1964 | Moklebust | 75—33 X |
| 3,185,563 | 5/1965 | Jones et al. | 75—36 X |

FOREIGN PATENTS 238,845  11/1959  Australia.

L. DEWAYNE RUTLEDGE, Primary Examiner

H. W. TARRING II, Assistant Examiner

U.S. Cl. X.R.

23—209.9; 75—26, 34; 209—171, 172